United States Patent
Liu et al.

(10) Patent No.: US 9,262,982 B2
(45) Date of Patent: Feb. 16, 2016

(54) TIMING CONTROLLER FOR LIQUID CRYSTAL PANEL

(71) Applicant: CHUNGHWA PICTURE TUBES, LTD., Padeh, Taoyuan (TW)

(72) Inventors: Yu-an Liu, Yunlin County (TW); Liang-Hua Yeh, Sanchong (TW)

(73) Assignee: Chunghwa Picture Tubes, Ltd., Taoyuan (TW)

(*) Notice: Subject to any disclaimer, the term of this patent is extended or adjusted under 35 U.S.C. 154(b) by 0 days.

(21) Appl. No.: 14/473,559

(22) Filed: Aug. 29, 2014

(65) Prior Publication Data

US 2014/0368418 A1  Dec. 18, 2014

Related U.S. Application Data

(62) Division of application No. 13/150,777, filed on Jun. 1, 2011, now Pat. No. 8,854,290.

(30) Foreign Application Priority Data

Dec. 9, 2010  (TW) .............................. 99143019 A

(51) Int. Cl.
  *G09G 3/36* (2006.01)
  *G06F 13/14* (2006.01)

(52) U.S. Cl.
  CPC .............. *G09G 3/3696* (2013.01); *G06F 13/14* (2013.01); *G09G 2310/08* (2013.01); *G09G 2320/0247* (2013.01); *G09G 2340/0435* (2013.01)

(58) Field of Classification Search
  CPC .............. G09G 2340/0435; G09G 2320/0247; G09G 2310/08
  See application file for complete search history.

(56) References Cited

U.S. PATENT DOCUMENTS

| | | |
|---|---|---|
| 2004/0041779 A1 | 3/2004 | Kang |
| 2010/0171688 A1 | 7/2010 | Wang |
| 2010/0277512 A1 | 11/2010 | Shen et al. |
| 2010/0295765 A1* | 11/2010 | Hsiao et al. ............... 345/98 |
| 2012/0105405 A1 | 5/2012 | Hsiao et al. |
| 2012/0169698 A1* | 7/2012 | Park et al. ............... 345/211 |
| 2012/0223927 A1 | 9/2012 | Hsieh et al. |

FOREIGN PATENT DOCUMENTS

| | | |
|---|---|---|
| CN | 101221742 | 7/2008 |
| CN | 101604514 | 12/2009 |
| TW | I277050 | 3/2007 |

* cited by examiner

*Primary Examiner* — Lixi C Simpson
(74) *Attorney, Agent, or Firm* — Muncy, Geissler, Olds & Lowe, P.C.

(57) ABSTRACT

A timing controller for a liquid crystal panel and a timing control method thereof are provided. The timing controller includes a timing control unit for analyzing an input signal to generate a system state transition voltage (STV) signal and a base STV signal, and the timing control unit outputs a base trigger signal and a switch trigger signal having asynchronous frame rates to a select unit at the same time. A compare unit determines whether frequencies of the two state signals are same, so that the select unit determines to forward the base trigger signal or the switch trigger signal to a level shift circuit. Finally, a signal-time control unit controls an output time of the base trigger signal, and controls an output time of the switch trigger signal, so that a liquid crystal unit connected to each gate line has an equal charge time.

4 Claims, 13 Drawing Sheets

TIMING CONTROLLER FOR LIQUID CRYSTAL PANEL

CROSS-REFERENCE TO RELATED APPLICATIONS

This application is a Divisional of co-pending application Ser. No. 13/150,777, filed Jun. 1, 2011, for which priority is claimed under 35 U.S.C. §120; and this application claims priority of Application No. 099143019, filed in Taiwan, R.O.C. on Dec. 9, 2010 under 35 U.S.C. §119, the entire contents of all of which are hereby incorporated by reference.

BACKGROUND OF THE INVENTION

1. Field of Invention

The present invention relates to a timing controller for a liquid crystal panel and a timing control method thereof, and more particularly to a timing controller for a liquid crystal panel and a timing control method thereof capable of automatically detecting a frequency of a system signal to switch to output a trigger signal corresponding to a frame rate, and at the same time controlling an output time of the trigger signal.

2. Related Art

FIG. 1A is a schematic view of a circuit architecture of a liquid crystal panel in the prior art. Currently, a gate in panel (GIP) technology has been widely used in manufacturing technologies of liquid crystal panels, which can decrease the fabrication cost of the liquid crystal panel, as no additional gate driver integrated circuit (IC) needs to be used when a shift register circuit 13 of a gate drive circuit is directly implemented in the panel (dashed line block in FIG. 1A). However, the circuit design manner of a source driver IC 15 is not changed.

FIG. 1B and FIG. 1C are timing diagrams of different working trigger signals for a circuit architecture of a liquid crystal panel in the prior art, and reference is made to FIG. 1A at the same time for ease of understanding. In an existing power saving mechanism of the liquid crystal panel, generally when a sleep mechanism is enabled, a frame rate of a working trigger signal is decreased to reduce an operational efficiency of hardware, so as to further achieve the objective of power saving. When a working mechanism is enabled, the frame rate of the working trigger signal is restored.

As shown in FIG. 1B, in a working mechanism period, a timing controller 11 supplies a working trigger signal having a frame rate of 60 Hz to a level shift circuit 12, and a charge time of each liquid crystal unit is between a falling edge of the trigger signal (TP) and a falling edge of a clock signal line (clk1~4) corresponding to the TP.

Further in FIG. 1C, in a sleep mechanism period, the timing controller 11 supplies a working trigger signal having a frame rate of 40 Hz, and the charge time of each liquid crystal unit is longer than that in the environment with the frame rate of 60 Hz. Therefore, when the frame rate is switched, a situation of inconsistent charge time might occur to the liquid crystal units, which leads to different display intensities of the liquid crystal panel, further resulting in a situation of instant flickering pictures.

However, the liquid crystal panel having the GIP architecture does not have Out Enable (OE) signal control lines. Therefore, the liquid crystal panel cannot use the OE signal control lines to adjust an enable time of a semiconductor channel layer of a thin-film transistor (TFT) element for a charge time of a liquid crystal unit connected to a gate line 14 of the shift register circuit 13, so as to control the charge time of the liquid crystal unit.

Therefore, the manufacturers shall consider the problem of how to avoid flickering pictures when the liquid crystal panel switches the frame rate.

SUMMARY OF THE INVENTION

Accordingly, the present invention is directed to a timing controller and a control method thereof capable of automatically detecting a frame rate and controlling a time of outputting a trigger signal.

In order to solve the problem of the timing controller, the present invention provides a timing controller for a liquid crystal panel, which is connected to a level shift circuit connected with a plurality of gate lines. The timing controller comprises a timing control unit, a compare unit, a select unit, and a signal-time control unit. The timing control unit is used for generating a system state transition voltage (STV) signal and a base STV signal according to an input signal, and providing a base trigger signal and a switch trigger signal having asynchronous frame rates. The compare unit is used for comparing frequencies of the system STV signal and the base STV signal, so as to generate frame rate select information. The input signal is a system input signal, or an input signal of a related type, and can also be input signals of other types in the future, which is not limited here. The system feeds the input signal into the liquid crystal panel through a display port, for example.

The select unit is used for acquiring the base trigger signal, the switch trigger signal, and the frame rate select information, and selecting and outputting one from the base trigger signal and the switch trigger signal according to the frame rate select information. The signal-time control unit is used for controlling an output time of the base trigger signal, and controlling an output time of the switch trigger signal, so that a liquid crystal unit connected to each gate line has an equal charge time.

In order to solve the problem of the timing controller, the present invention provides another timing controller for a liquid crystal panel, which is connected to a level shift circuit connected with a plurality of gate lines. The timing controller comprises a timing control unit, a signal receive unit, a frame rate detect unit, a select unit, and a signal-time control unit. The timing control unit is used for providing a plurality of trigger signals having asynchronous frame rates. The signal receive unit is used for receiving an external input signal to generate a system STV signal. The frame rate detect unit is connected to the signal receive unit and used for analyzing a frequency of the system STV signal, so as to generate frame rate select information. The select unit selects one target trigger signal from the trigger signals according to the frame rate select information and outputs the target trigger signal to the level shift circuit. The signal-time control unit is used for controlling an output time of each trigger signal, so that a liquid crystal unit connected to each gate line has an equal charge time when a different trigger signal is output.

In order to solve the problem of the timing control method, the present invention provides a signal timing control method for a liquid crystal panel, which is applied in a timing controller for a liquid crystal panel. The timing controller is connected to a level shift circuit connected with a plurality of gate lines. The control method comprises: generating a system STV signal according to an input signal; analyzing a frequency of the system STV signal to generate frame rate select information; selecting one target trigger signal from a plurality of trigger signals having asynchronous frame rates according to the frame rate select information and outputting the target trigger signal to the level shift circuit; and controlling an output time of the target trigger signal, so that a liquid crystal unit connected to each gate line has an equal charge time at each trigger signal.

The present invention has the following characteristics. Firstly, the timing controller provided in the present invention automatically switches a frame rate of a trigger signal according to a frequency of an input signal, so as to adapt to frame rate requirements in various working mechanism requirements of the liquid crystal panel circuit. Next, by controlling the output time of the trigger signals, when the trigger signals having asynchronous frame rates are switched, the charge time of the liquid crystal unit connected to each gate line before and after switching the trigger signals is equal, thus stabilizing the display intensity of the liquid crystal panel and avoiding the situation of instant flickering pictures. Further, both the timing controller and the control method provided in the present invention can be implemented without OE signal control lines, and thus can be used in different liquid crystal panels, so the timing controller of the present invention is more applicable than other timing controllers.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Preferred embodiments of the present invention are illustrated in detail below with reference to the accompanying drawings.

Figure 1A:
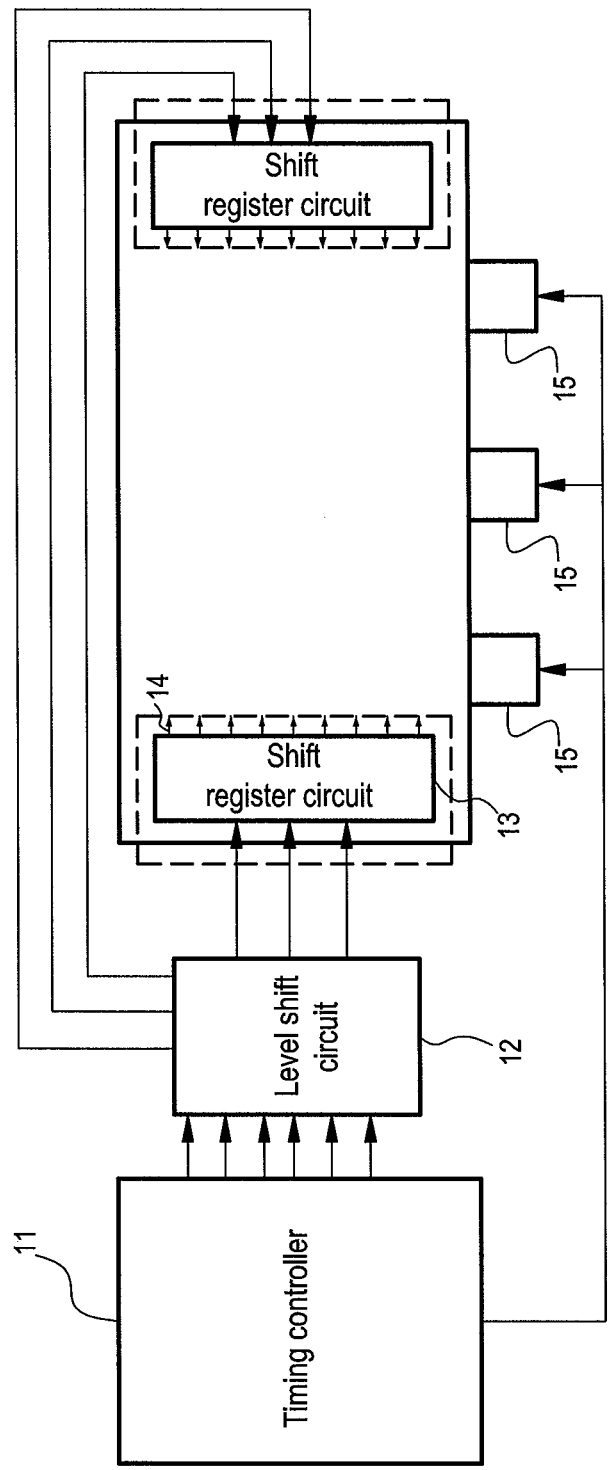
FIG. 1A is a schematic view of a circuit architecture of a liquid crystal panel in the prior art.
Figure 2A:
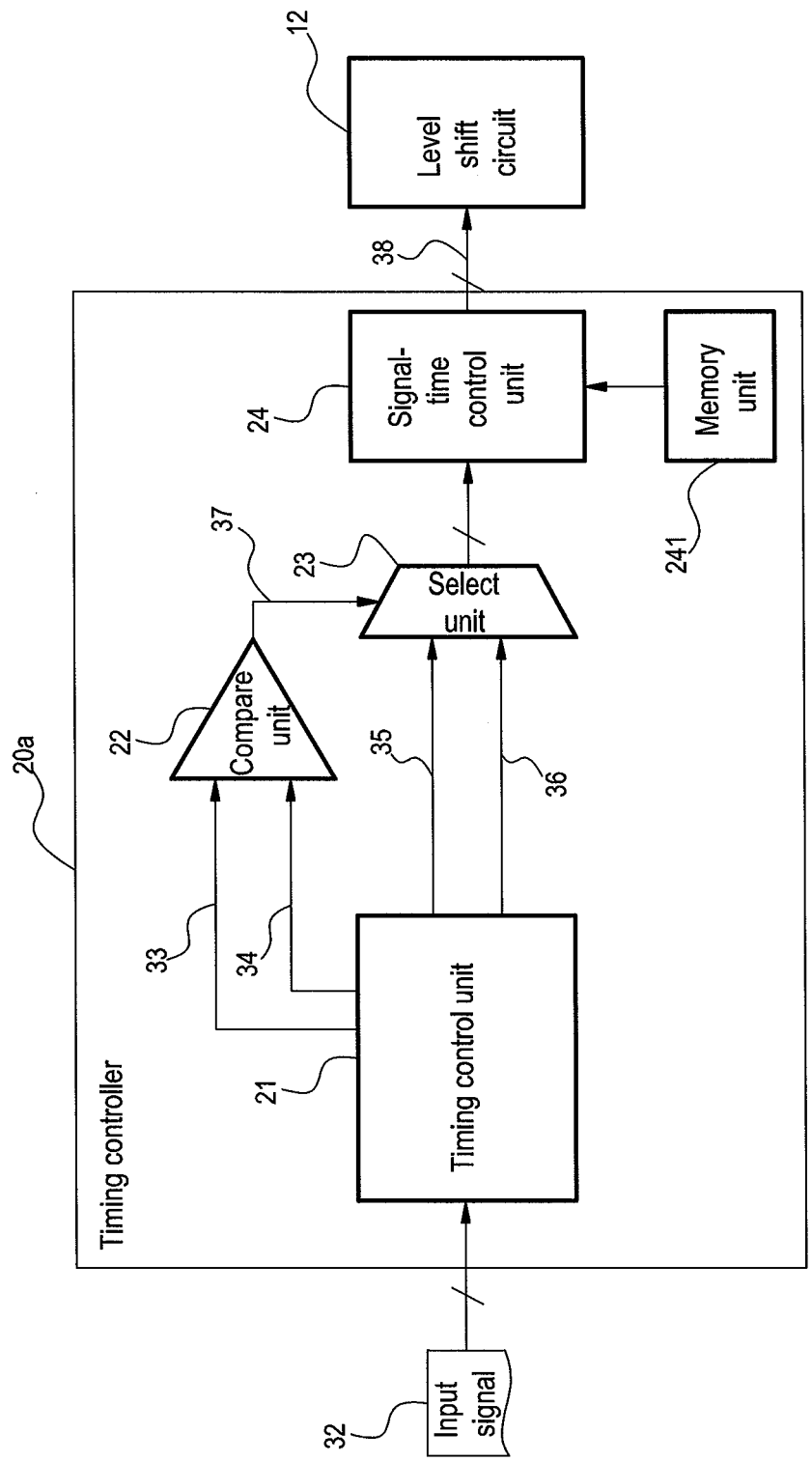
FIG. 2A is a schematic view of an architecture of a first timing controller according to an embodiment of the present invention.
Figure 2B:
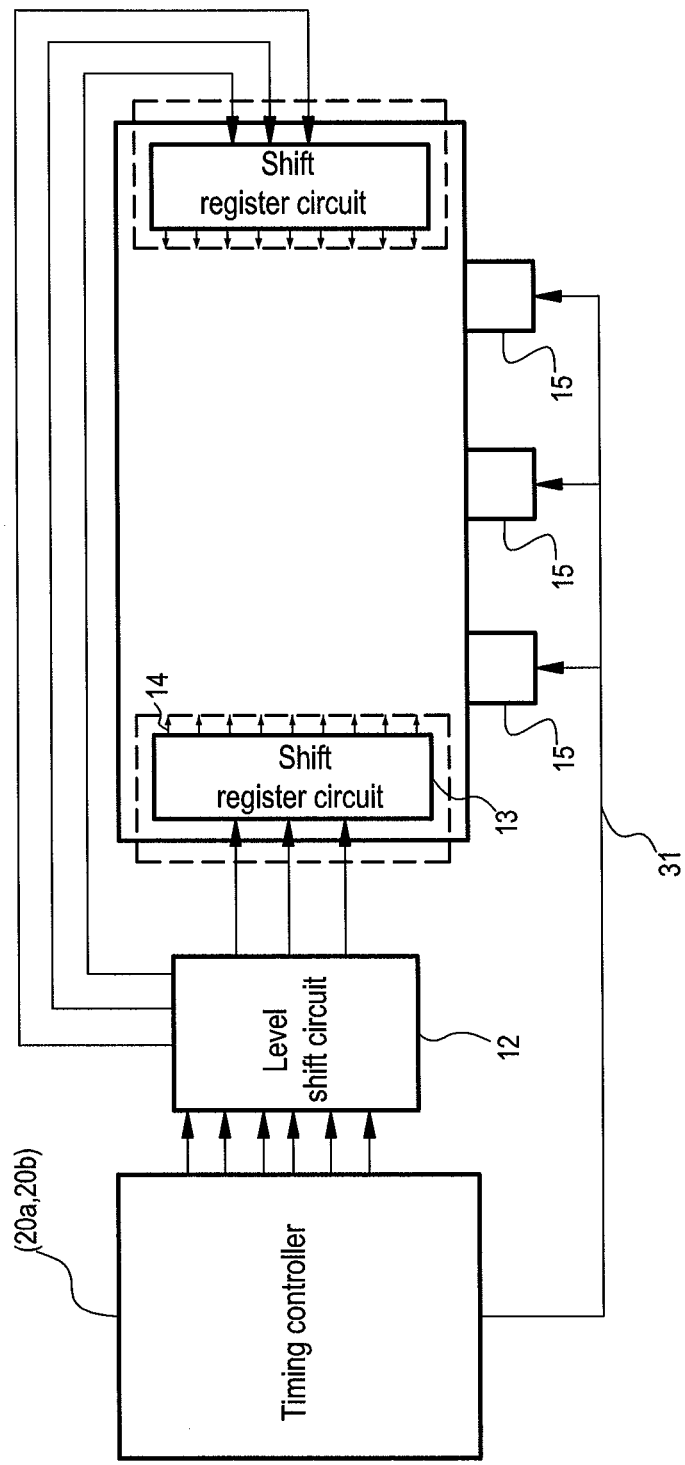
FIG. 2B is a schematic view of an architecture of a liquid crystal panel according to an embodiment of the present invention.

First, FIG. 2A is a schematic view of an architecture of a first timing controller according to an embodiment of the present invention, which is applied in an architecture of a liquid crystal panel as shown in FIG. 2B, and the difference between the architectures in FIG. 2A and FIG. 1A lies in the design architecture and operation actions of the timing controller.

Referring to FIG. 2A and FIG. 2B at the same time, a timing controller 20a is electrically connected to a level shift circuit 12, and the level shift circuit 12 is then electrically connected to a plurality of gate lines 14 of the shift register circuit 13. The timing controller 20a is also connected to a plurality of source driver ICs 15, so as to provide digital image data 31 to the source driver ICs 15, and controls the source driver ICs 15, the level shift circuit 12, and the gate lines 14 connected thereto, so as to send the digital image data 31 to each liquid crystal unit of the liquid crystal panel, thereby performing picture displaying and refreshing procedures.

As shown in FIG. 2A, the timing controller 20a includes a timing control unit 21, a compare unit 22, a select unit 23, and a signal-time control unit 24. The timing control unit 21 acquires an input signal 32 transferred from a control circuit or other electronic devices of the liquid crystal panel, and analyzes a frequency of the input signal 32, so as to provide a system STV signal 33 having a frequency equal to that of the input signal 32 and a base STV signal 34 as a frequency base. In addition, the timing control unit 21 provides a base trigger signal 35 and a switch trigger signal 36 having two asynchronous frame rates.

The compare unit 22 is connected to the timing control unit 21, and used for acquiring the system STV signal 33 and the base STV signal 34, and analyzing whether frequencies of the two are consistent, so as to generate a frame rate select information 37.

The select unit 23 is connected to the timing control unit 21 and the compare unit 22 at the same time, receives the base trigger signal 35, the switch trigger signal 36, and the frame rate select information 37, selects the base trigger signal 35 or the switch trigger signal 36 as a target trigger signal 38 according to the frame rate select information 37, and outputs the target trigger signal 38 to the level shift circuit 12.

The signal-time control unit 24 is connected to the select unit 23, and no matter whether the select unit 23 uses the base trigger signal 35 or the switch trigger signal 36 as the target trigger signal 38, the signal-time control unit 24 controls the output time of the target trigger signal 38, and the liquid crystal unit connected to each gate line 14 has an equal charge time before and after switching the trigger signals.

For example, it is assumed that the compare unit 22 is a comparator, which outputs 0 when the frequencies of the input signals are same and outputs 1 when the frequencies of the input signals are different. The select unit 23 is a multiplexer, a port 0 of the multiplexer receives a switch trigger signal 36 having a frame rate of 40 Hz, a port 1 of the multiplexer receives a base trigger signal 35 having a frame rate of 60 Hz, and a frequency of the base STV signal 34 is 60 Hz.

When the frequency of the input signal 32 acquired by the timing control unit 21 is 60 Hz, the frequency of the system STV signal 33 generated by the timing control unit 21 is also 60 Hz, and the compare unit 22 generates frame rate select information 37 having a value of 0 as both the frequencies of the acquired system STV signal 33 and base STV signal 34 are 60 Hz. The select unit selects the base trigger signal 35 having the frame rate of 60 Hz as the target trigger signal 38 according to the input frame rate select information 37 having the value of 0 and outputs the target trigger signal 38 to the level shift circuit 12. At the same time, the signal-time control unit 24 periodically controls an output time length of the base trigger signal 35.

On the contrary, when the frequency of the input signal 32 acquired by the timing control unit 21 is 40 Hz, the frequency of the system STV signal 33 generated by the timing control unit 21 is 40 Hz, and the compare unit 22 generates frame rate select information 37 having a value of 1 as the frequencies of the acquired system STV signal 33 and base STV signal 34 are different. The select unit 23 selects the switch trigger signal 36 having the frame rate of 40 Hz as the target trigger signal 38 according to the frame rate select information 37 having the value of 1 and outputs the target trigger signal 38 to the level shift circuit 12. At the same time, the signal-time control unit 24 periodically controls an output time length of the switch trigger signal 36.

Figure 3A:
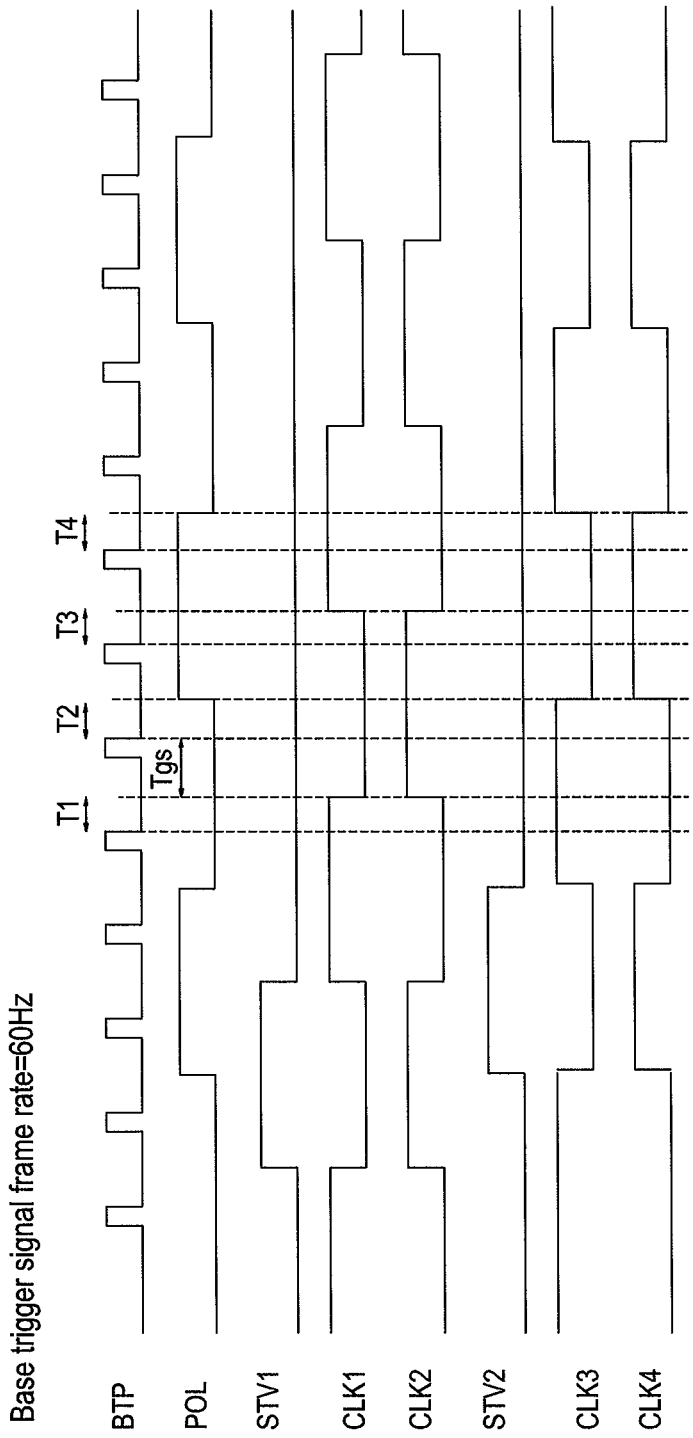
FIG. 3A and FIG. 3B are timing diagrams before and after switching a frame rate according to an embodiment of the present invention.
Figure 3B:
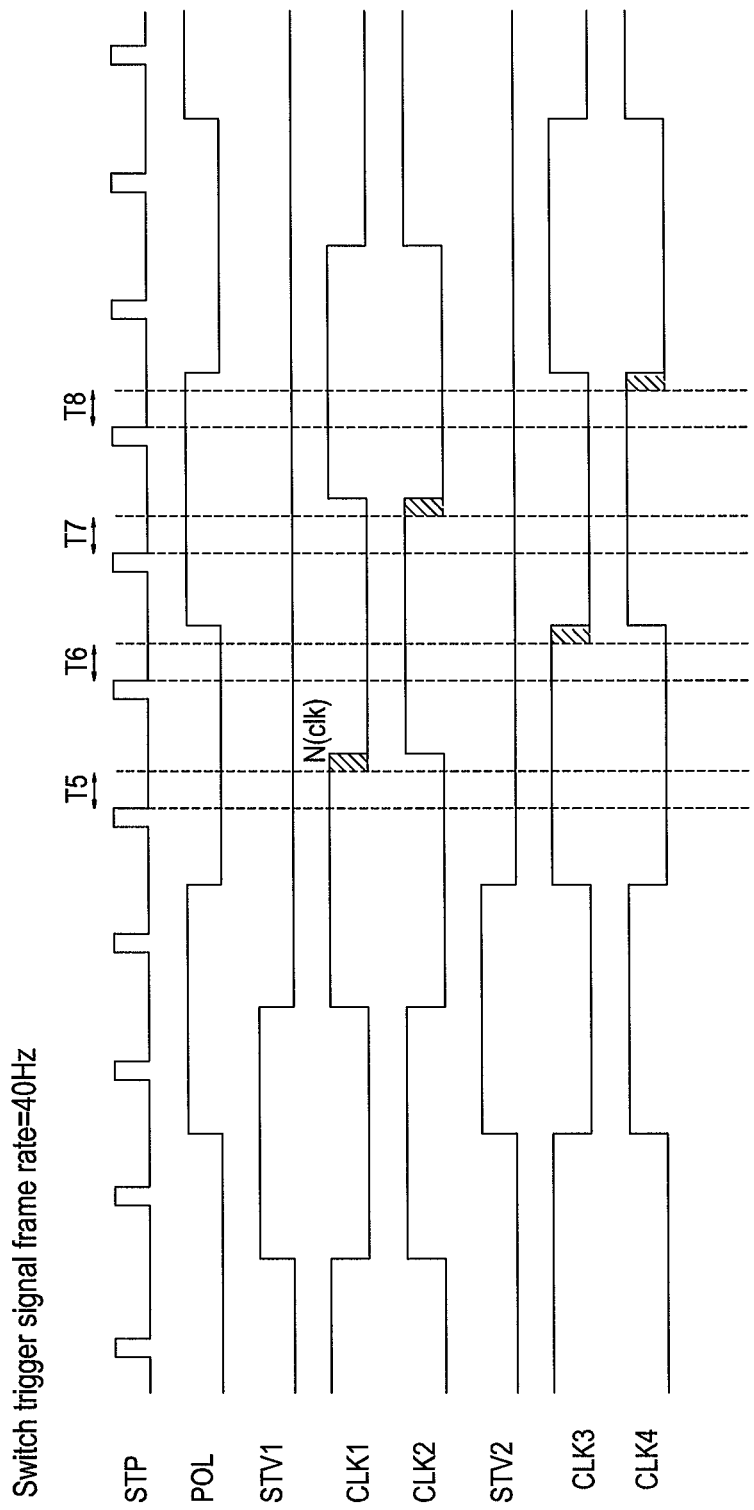

FIG. 3A and FIG. 3B are timing diagrams before and after switching a frame rate according to an embodiment of the present invention, and reference is made to FIG. 2A and FIG. 2B at the same time for ease of understanding. The signal-time control unit 24 calculates two different charge time of the liquid crystal unit connected to each gate line 14 at the base trigger signal 35 and the switch trigger signal 36 and calculates a charge time difference value according to the frequency of the base trigger signal 35 and the frequency of the switch trigger signal 36, and then adjusts the output time of the switch trigger signal 36 according to the charge time difference value, so that the charge time of the liquid crystal unit connected to each gate line 14 at the switch trigger signal 36 is equal to the charge time of the liquid crystal unit connected to each gate line 14 at the base trigger signal 35. An example of calculation of the output time length of the switch trigger signal 36 is illustrated below.

As shown in FIG. 3A, in a working mechanism period of the liquid crystal panel, the timing controller 20a outputs a base trigger signal 35 having a frame rate of 60 Hz, and a charge time of each liquid crystal unit is between a falling edge of the base trigger signal (BTP) 35 and a falling edge of a clock signal line (clk1~4) corresponding to the BTP.

As shown in FIG. 3B, in a sleep mechanism period of the liquid crystal panel, the timing controller 20a outputs a switch trigger signal (STP) 36 having a frame rate of 40 Hz, and the charge time of each liquid crystal unit is longer than that in the environment with the frame rate of 60 Hz.

Here, it is assumed that T1 is a charge time of a first gate line at a frame rate of 60 Hz, T5 is a charge time of the first gate line at a frame rate of 40 Hz, and Tgs (clk) is a clock (clk) number required from turn-off of a previous order gate line to turn-on of a next order source line. If T1=T5, a charge time difference value N(clk) in Formula (3) is calculated through the following Formula (1) and Formula (2), and then, at the frame rate of 40 Hz (FIG. 3B), a time width of N(clk) is subtracted from a time width of each clock signal line (clk1~4) at a high position, so as to acquire the output time of the switch trigger signal.

$$T1 = \frac{1}{BTP \text{ frame rate} \times V total} - Tgs(clk) \times \frac{1}{Dotclk} \quad \text{Formula (1)}$$

$$T5 = \frac{1}{STP \text{ frame rate} \times V total} - \\ (N(clk) + Tgs(clk)) \times \frac{1}{(Dotclk) \times \frac{\text{switch frame rate}}{\text{base frame rate}}} \quad \text{Formula (2)}$$

$$N(clk) = Htotal - Tgs(clk) \times \left(1 - \frac{\text{switch frame rate}}{\text{base frame rate}}\right) \quad \text{Formula (3)}$$

$V_{total} = V_{active} + V_{blanking}$, where $V_{total}$ is the total number of horizontal lines in one frame, $V_{active}$ is the number of horizontal lines in a display region, and $V_{blanking}$ is the number of horizontal lines in a blanking region. Dotclk is a pixel frequency. $H_{total} = H_{active} + H_{blanking}$, where $H_{total}$ is the total number of Dotclk within n horizontal lines, $H_{active}$ is the number of Dotclk in the display region, and $H_{blanking}$ is the number of Dotclk of a blanking block.

However, the signal-time control unit 24 is further electrically connected to a memory unit 241, and each trigger signal and an output time thereof are recorded in a matched manner in the memory unit 241 in advance, so that after reading the memory unit 241, the signal-time control unit 24 can acquire and control an output time of the target trigger signal 38 (either the base trigger signal 35 or the switch trigger signal 36). In addition, in this embodiment, the frequency of the base trigger signal 35 is 60 Hz, and the frequency of the switch trigger signal 36 is 40 Hz, but the present invention is not limited thereto, for example, the frequency of the switch trigger signal 36 may also be 75 Hz. Alternatively, the frequency of the base trigger signal 35 is 75 Hz, the frequency of the switch trigger signal 36 is 40 Hz or 60 Hz, or other operable frequencies of the liquid crystal panel are all applicable.

Figure 1B:
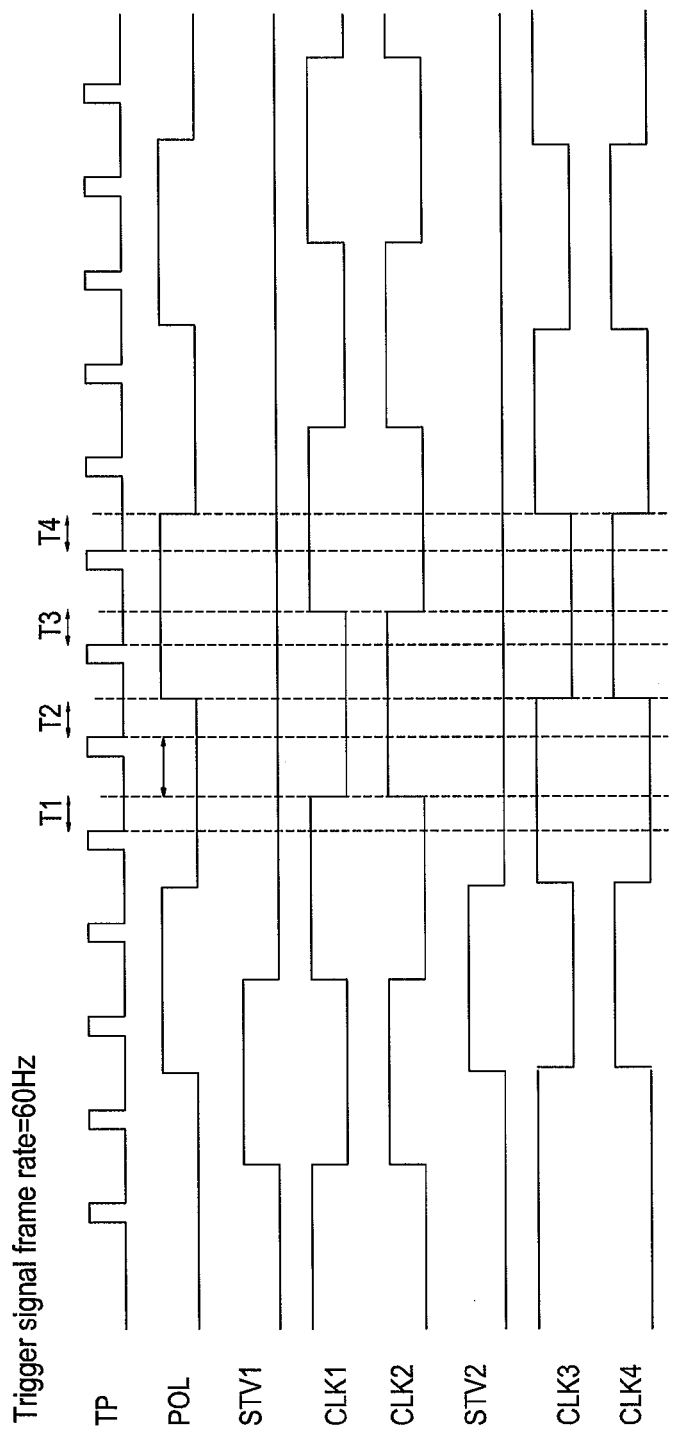
FIG. 1B and FIG. 1C are timing diagrams of different working trigger signals for a circuit architecture of a liquid crystal panel in the prior art.
Figure 1C:
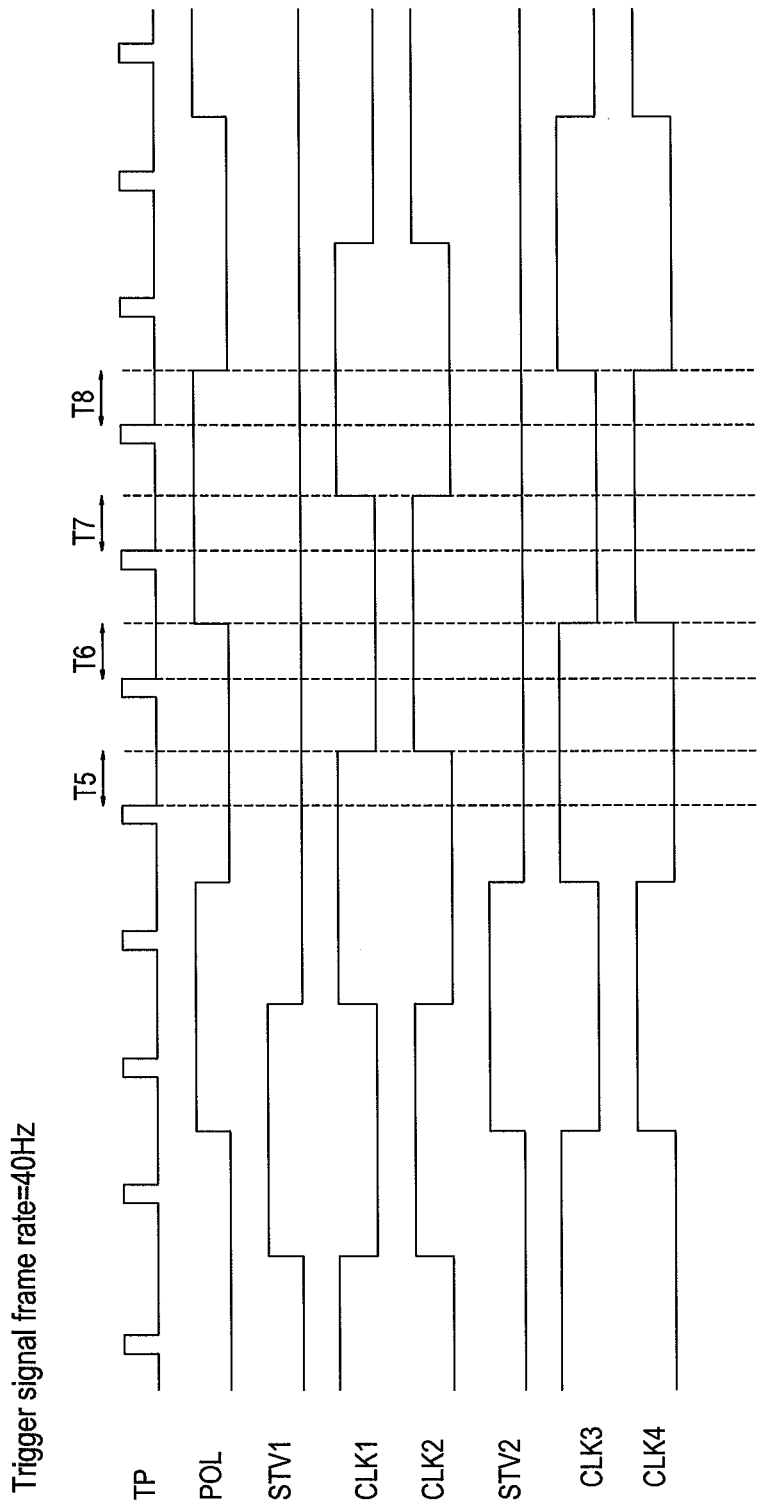
Figure 4:
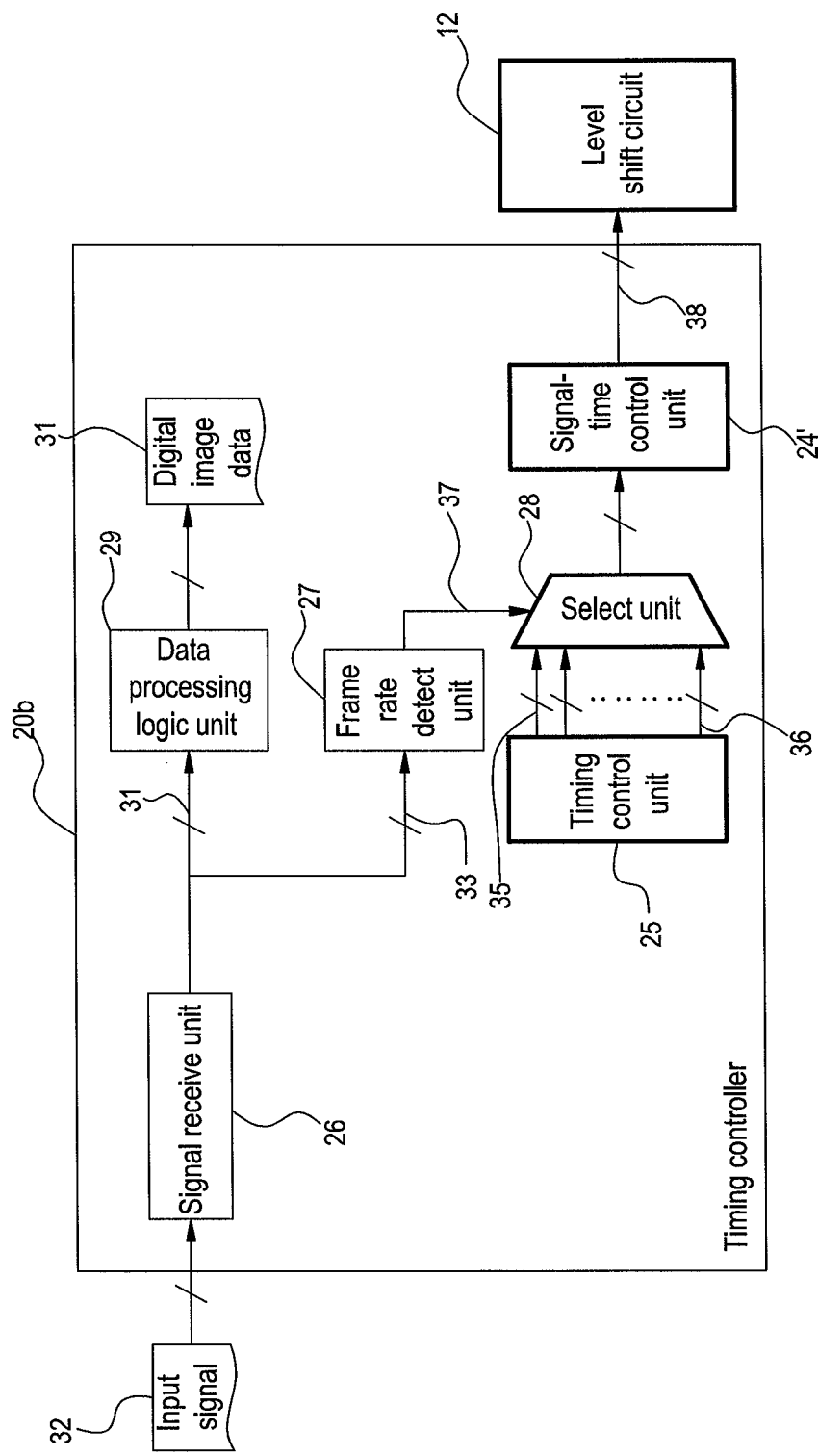
FIG. 4 is a schematic view of an architecture of a second timing controller according to an embodiment of the present invention.

FIG. 4 is a schematic view of an architecture of a second timing controller according to an embodiment of the present invention, which is applied in an architecture of a liquid crystal panel as shown in FIG. 2B, and the difference between the architectures in FIG. 4 and FIG. 1 lies in the design architecture and operation actions of the timing controller.

As shown in FIG. 4, the timing controller 20b includes a timing control unit 25, a signal receive unit 26, a frame rate detect unit 27, a select unit 28, and a signal-time control unit 24'.

The timing control unit 25 provides a plurality of trigger signals having asynchronous frame rates, and stores control information of an output time of each trigger signal.

The signal receive unit 26 (for example, a low-voltage differential signal (LVDS) receiver) is used for receiving an external input signal 32 and analyzing information included in the input signal 32 to differentiate digital image data 31 and a system STV signal 33. The digital image data 31 is transferred to a data processing logic unit 29, and the system STV signal 33 recording a working frequency of the system is transmitted to the frame rate detect unit 27.

The frame rate detect unit 27 analyzes a frequency of the system STV signal 33, so as to generate frame rate select information 37, which includes a select value of the trigger signal. The select unit 28 receives the frame rate select information 37, selects one from all trigger signals as a target trigger signal 38 according to the select value of the trigger signal, and outputs the target trigger signal 38 to the level shift circuit 12.

However, no matter which trigger signal is used by the select unit 23 as the target trigger signal 38, the signal-time control unit 24' periodically controls sending timing of the target trigger signal 38 according to the matched output time of the target trigger signal 38, so that the liquid crystal unit connected to each gate line 14 has an equal charge time before and after switching the target trigger signal.

Figure 3C:
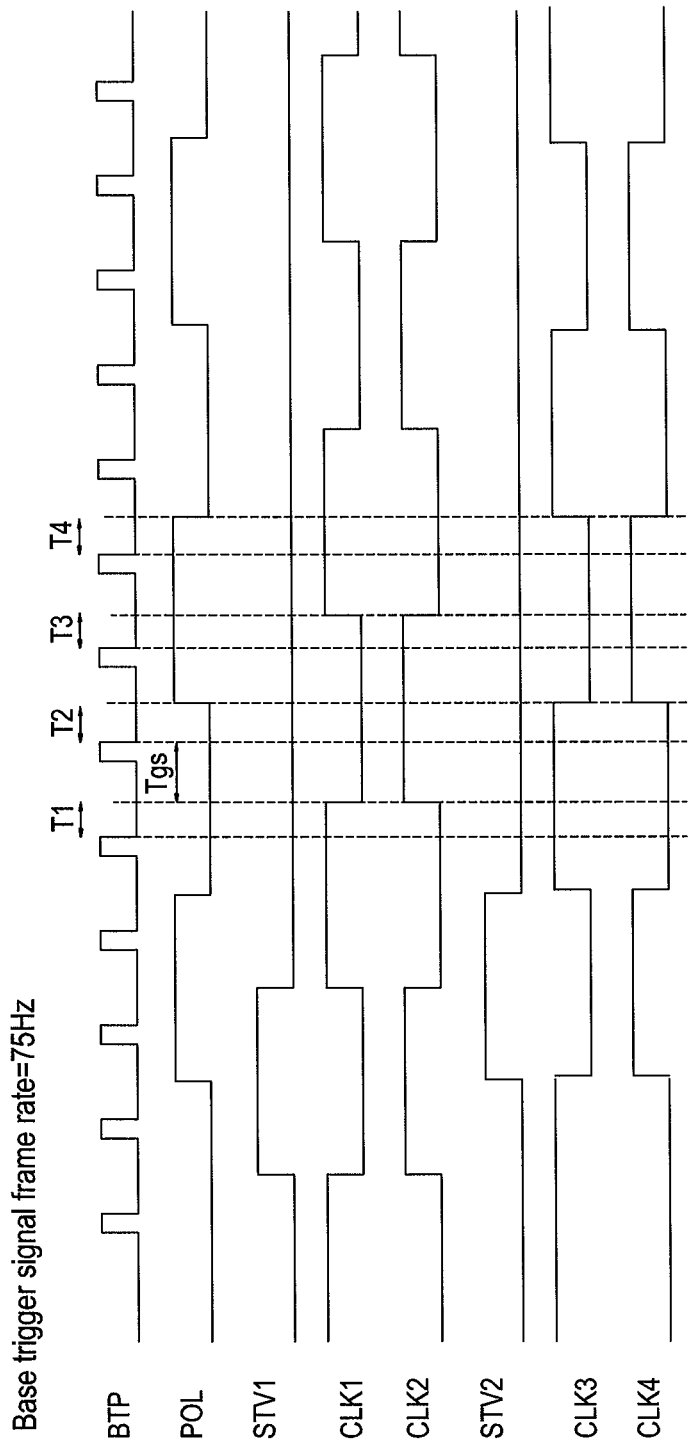
FIG. 3C and FIG. 3D are timing diagrams before and after selectively switching a frame rate according to an embodiment of the present invention.
Figure 3D:
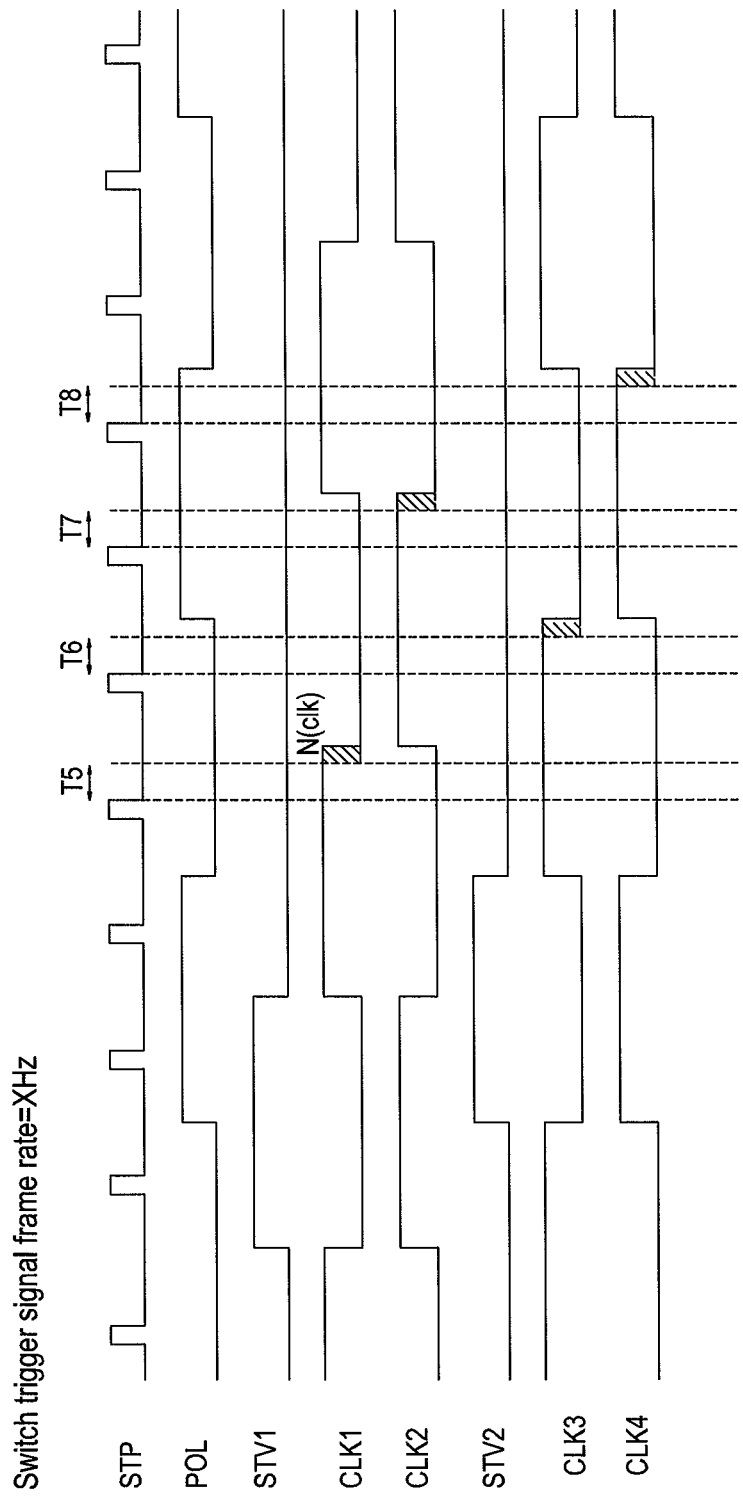

FIG. 3C and FIG. 3D are timing diagrams before and after selectively switching a frame rate according to an embodiment of the present invention, and reference is made to FIG. 4 at the same time for ease of understanding. As described above, the signal-time control unit 24' periodically controls the sending timing of the target trigger signal 38 according to the matched output time of the target trigger signal 38. However, this mode also needs a base trigger signal frame rate as a base, and switching to a switch trigger signal frame rate having a relatively low frequency is illustrated.

As shown in FIG. 3C, in a working mechanism period of the liquid crystal panel, the timing controller 20b outputs a base trigger signal 35 having a frame rate of 75 Hz, and a charge time of each liquid crystal unit is between a falling edge of the base trigger signal (BTP) 35 and a falling edge of a clock signal line (clk1~4) corresponding to the BTP.

As shown in FIG. 3D, in a sleep mechanism period of the liquid crystal panel, the timing controller 20b outputs a switch trigger signal (STP) 36 having a frame rate of X (for example, 60 Hz, or even 40 Hz), and the charge time of each liquid crystal unit is longer than that in the environment with the frame rate of 75 Hz.

Here, it is assumed that T1 is a charge time of a first gate line at a frame rate of 75 Hz, T5 is a charge time of the first gate line at a frame rate of X Hz (the frequency is lower than 75 Hz), and Tgs (clk) is a clock (clk) number required from turn-off of a previous order gate line to turn-on of a next order source line. Same as the embodiment above, if T1=T5, a charge time difference value N(clk) in Formula (3) should be calculated through Formula (1) and Formula (2), and then, at the frame rate X Hz (FIG. 3D), a time width of N(clk) is subtracted from a time width of each clock signal line (clk1~4) at a high position, so as to acquire the output time of the switch trigger signal.

$$T1 = \frac{1}{BTP\,\text{frame rate} \times Vtotal} - Tgs(clk) \times \frac{1}{Dotclk} \quad \text{Formula (1)}$$

$$T5 = \frac{1}{STP\,\text{frame rate} \times A \times Vtotal} - (N(clk) + Tgs(clk)) \times \frac{1}{(Dotclk) \times A} \quad \text{Formula (2)}$$

or $$T5 = \frac{1}{BTP\,\text{frame rate} \times A \times Vtotal} - (N(clk) + Tgs(clk)) \times \frac{1}{(Dotclk) \times A}$$

$$N(clk) = Htotal - Tgs(clk) \times (1 - A) \quad \text{Formula (3)}$$

$V_{total} = V_{active} + V_{blanking}$, where $V_{total}$ is the total number of horizontal lines in one frame, $V_{active}$ is the number of horizontal lines in a display region, and $V_{blanking}$ is the number of horizontal lines in a blanking region. Dotclk is a pixel frequency. $H_{total} = H_{active} + H_{blanking}$, where $H_{total}$ is the total number of Dotclk within n horizontal lines, $H_{active}$ is the number of Dotclk in the display region, and $H_{blanking}$ is the number of Dotclk of a blanking block. A is the above $$\frac{\text{switch frame rate}}{\text{base frame rate}}.$$

Thus, the signal-time control unit 24' completes analysis and calculation procedures of output time of trigger signals having different frequencies, and controls an output time of the target trigger time 38 according to a calculation result, so that a charge time of a liquid crystal unit connected to each gate line 14 at each trigger signal is equal to a charge time in the condition of the base trigger signal.

However, the frequency calculation results can also be recorded in the timing control unit 25, the signal-time control unit 24' or a built-in memory of the timing controller 20b, so as to facilitate the timing control unit 25 to output required trigger signals, or enable the signal-time control unit 24' to refer to corresponding control information immediately upon acquiring the target trigger signal 38, so as to control the output time of the target trigger signal 38 immediately.

Figure 5A:
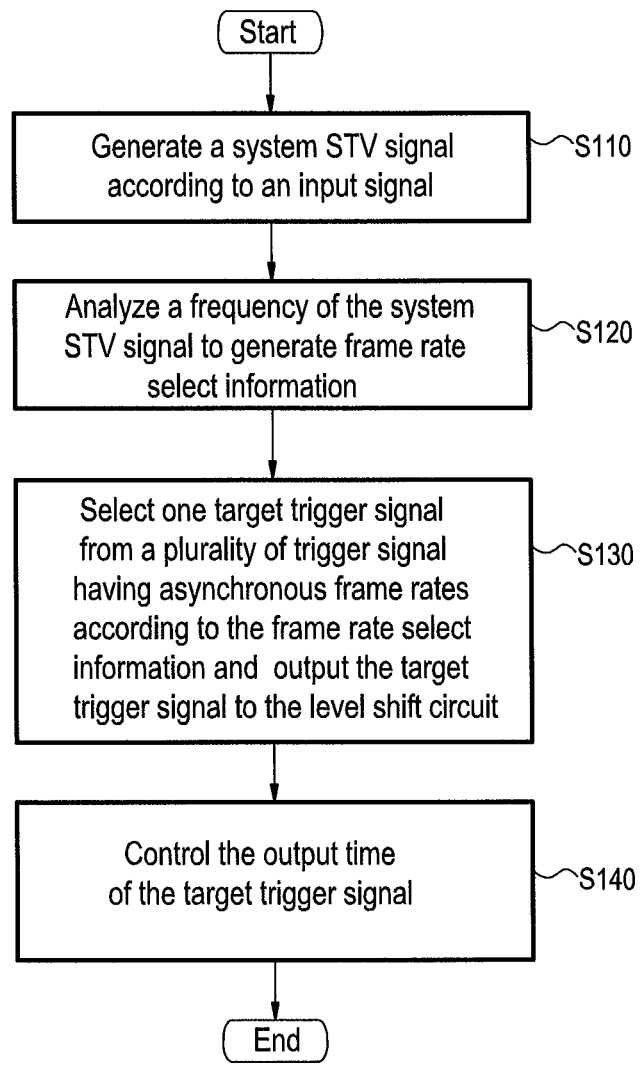
FIG. 5A illustrates a signal timing control method for a liquid crystal panel according to an embodiment of the present invention.

FIG. 5A illustrates a signal timing control method for a liquid crystal panel according to an embodiment of the present invention, which is applicable in the timing controllers in FIG. 2 and FIG. 4. Reference is made to FIG. 3A and FIG. 3B, FIG. 3C and FIG. 3D at the same time in combination with detailed schematic flow charts of the process in FIG. 5A of the present invention in FIG. 5B to FIG. 5E for ease of understanding. The situations of the method being separately implemented in two embodiments are illustrated below.

A system STV signal is generated according to an input signal (Step S110).

For the first embodiment, the timing control unit 21 acquires an input signal 32 transferred from a control circuit or other electronic devices of the liquid crystal panel, and analyzes a frequency of the input signal 32, so as to provide a system STV signal 33 having a frequency equal to that of the input signal 32 and a base STV signal 34 as a frequency base. In addition, the timing control unit 21 provides a base trigger signal 35 and a switch trigger signal 36 having two asynchronous frame rates at the same time.

For the second embodiment, the signal receive unit 26 receives an external input signal 32, and analyzes information included in the input signal 32 to differentiate digital image data 31 and a system STV signal 33, and the system STV signal 33 is transmitted to the frame rate detect unit 27.

A frequency of the system STV signal is analyzed to generate frame rate select information (Step S120).

Figure 5B:
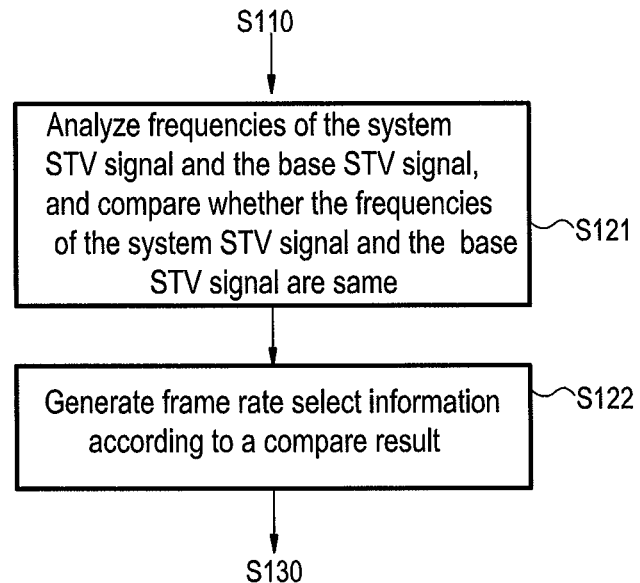
FIG. 5B to FIG. 5E are detailed schematic flow charts of the process in FIG. 5A according to an embodiment of the present invention.

As shown in FIG. 5B, in the first embodiment, the compare unit 22 analyzes frequencies of the system STV signal 33 and the base STV signal 34, compares whether the frequencies of the system STV signal 33 and the base STV signal 34 are same (Step S121), and then generates frame rate select information 37 according to a compare result (Step S122).

Figure 5C:
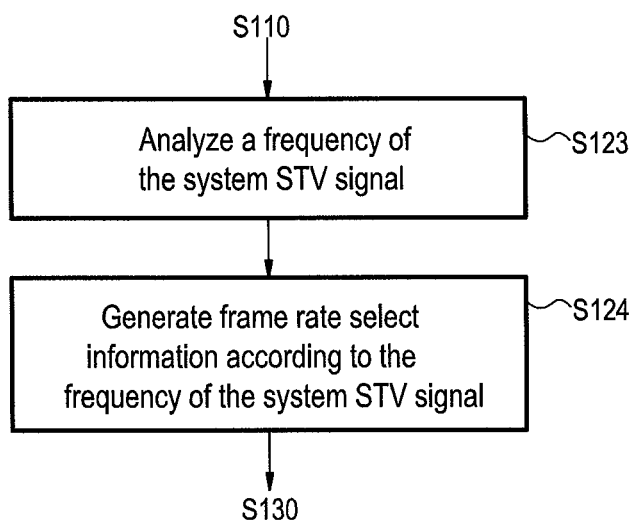

As shown in FIG. 5C, in the second embodiment, the frame rate detect unit 27 analyzes a frequency of the system STV signal 33 (Step S123), so as to generate frame rate select information 37 according to the frequency of the system STV signal 33 (Step S124), and the frame rate select information 37 includes a select value of the trigger signal.

One target trigger signal 38 is selected from a plurality of trigger signals having asynchronous frame rates according to the frame rate select information 37, and is output to the level shift circuit 12 (Step S130).

In the first embodiment, the select unit 23 receives the base trigger signal 35, the switch trigger signal 36, and the frame rate select information 37, selects the base trigger signal 35 or the switch trigger signal 36 as the target trigger signal 38 according to the frame rate select information 37, and then outputs the target trigger signal 38 to the level shift circuit 12.

In the second embodiment, the select unit 28 receives the frame rate select information 37, selects one from the trigger signals as the target trigger signal 38 according to the select value of the trigger signal included therein, and outputs the target trigger signal 38 to the level shift circuit 12.

Figure 5D:
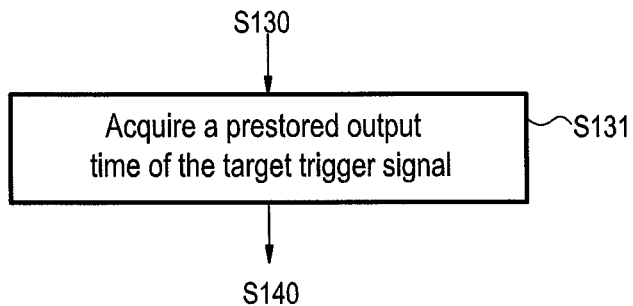

As shown in FIG. 5D, in either the first embodiment or the second embodiment, before the target trigger signal 38 is output, a prestored output time of the target trigger signal 38 is acquired (Step S131).

In the first embodiment, the signal-time control unit 24 reads the output time matching the target trigger signal 38 from a memory unit 241 connected thereto. In the second embodiment, the matched output time of each trigger signal is recorded in the timing control unit 25 in advance for use by the timing control unit 25.

Figure 5E:
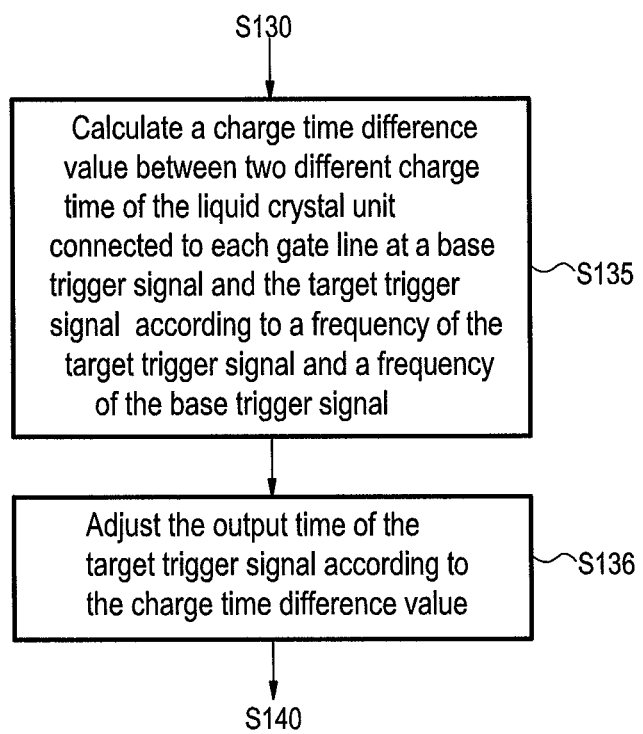

Alternatively, as shown in FIG. 5E, a charge time difference value between two different charge time of the liquid crystal unit connected to each gate line 14 at a base trigger signal 35 and the target trigger signal 38 is calculated according to a frequency of the target trigger signal 38 and a frequency of the base trigger signal 35 (Step S135).

Both the signal-time control unit 24 in the first embodiment and the timing control unit 21 in the second embodiment calculate two different charge time of the liquid crystal unit connected to each gate line 14 at the base trigger signal 35 and the target trigger signal and calculate a charge time difference value according to above Formula (1), Formula (2) or Formula (3), and then adjust the output time of the target trigger signal 38 according to the charge time difference value.

Both the signal-time control unit 24 in the first embodiment and the signal-time control unit 24' in the second embodiment adjust the output time of the target trigger signal 38 according to the charge time difference value (Step S136). Therefore, when the target trigger signal is output, the output time of the target trigger signal 38 is controlled (Step S140), so that the liquid crystal unit connected to each gate line 14 has an equal charge time before and after switching the trigger signals, thus stabilizing the display intensity of the liquid crystal panel and avoiding the situation of instant flickering pictures.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A timing controller for a liquid crystal panel, connected to a level shift circuit connected with a plurality of gate lines, the timing controller comprising:

a timing control unit, used for providing a plurality of trigger signals having asynchronous frame rates;

a signal receive unit, used for generating a system state transition voltage (STV) signal according to an external input signal;

a frame rate detect unit, connected to the signal receive unit and used for analyzing a frequency of the system STV signal, so as to generate a frame rate select information;

a select unit, connected to the timing control unit and the frame rate detect unit, and used for selecting one target trigger signal from the trigger signals according to the frame rate select information and outputting the target trigger signal to the level shift circuit; and a signal-time control unit, used for controlling an output time of each trigger signal, so that a liquid crystal unit connected to each gate line has an equal charge time at each trigger signal when a different trigger signal is output.

2. The timing controller according to claim 1, wherein the trigger signals comprise a base trigger signal and a plurality of switch trigger signals, a frequency of the base trigger signal is 75 Hz, and a frequency of the switch trigger signal is 60 Hz and 40 Hz.

3. The timing controller according to claim 2, wherein the output time of the trigger signals is recorded in the timing control unit.

4. The timing controller according to claim 2, wherein the signal-time control unit calculates a charge time difference value between two different charge time of the liquid crystal unit connected to each gate line at the base trigger signal and the target trigger signal according to the frequency of the base trigger signal and the frequency of the target trigger signal, so as to adjust an output time of the target trigger signal, so that the charge time of the liquid crystal unit connected to each gate line at the target trigger signal is equal to the charge time of the liquid crystal unit connected to each gate line at the base trigger signal.

* * * * *